United States Patent [19]

Glavitsch et al.

[11] 4,336,488

[45] Jun. 22, 1982

[54] TRANSFORMER FOR THE CONTROLLABLE SHIFTING OF THE PHASE ANGLE OF OUTPUT VOLTAGES IN RELATION TO THE PHASE ANGLES OF INPUT VOLTAGES

[75] Inventors: Hans Glavitsch, Nussbaumen; Gerhard Güth, Baden, both of Switzerland

[73] Assignee: BBC Brown, Boveri & Company Limited, Baden, Switzerland

[21] Appl. No.: 168,494

[22] Filed: Jul. 14, 1980

[30] Foreign Application Priority Data

Jul. 25, 1979 [CH] Switzerland ........................ 6874/79

[51] Int. Cl.³ ............................................. H03K 3/352
[52] U.S. Cl. .................................... 323/215; 323/217
[58] Field of Search ................................ 323/215-217

[56] References Cited

U.S. PATENT DOCUMENTS 3,975,673  8/1976  Boshnyaga et al. ............ 323/217 X

FOREIGN PATENT DOCUMENTS 562873  8/1977  U.S.S.R. .............................. 323/215

Primary Examiner—A. D. Pellinen
Attorney, Agent, or Firm—Werner W. Kleeman

[57] ABSTRACT

A transformer which is suitable for connecting with a compound network and renders possible shifting the phase angle of the secondary side-output voltage in relation to the primary side-input voltage. The secondary windings are divided into winding stages and there are provided lines and switches, by means of which these winding stages can be selectively connected in series. Since the phase angle of the voltage in each winding stage coincides with the angle of the corresponding winding, it is possible to vectorially add in this manner partial voltages with different phase angles, so that at the output terminal of one winding there appears a composite voltage whose phase angle is aligned in the same direction as said one winding or, in relation to such direction, is shifted through a predetermined angle value in clockwise direction or in counterclockwise direction.

4 Claims, 10 Drawing Figures

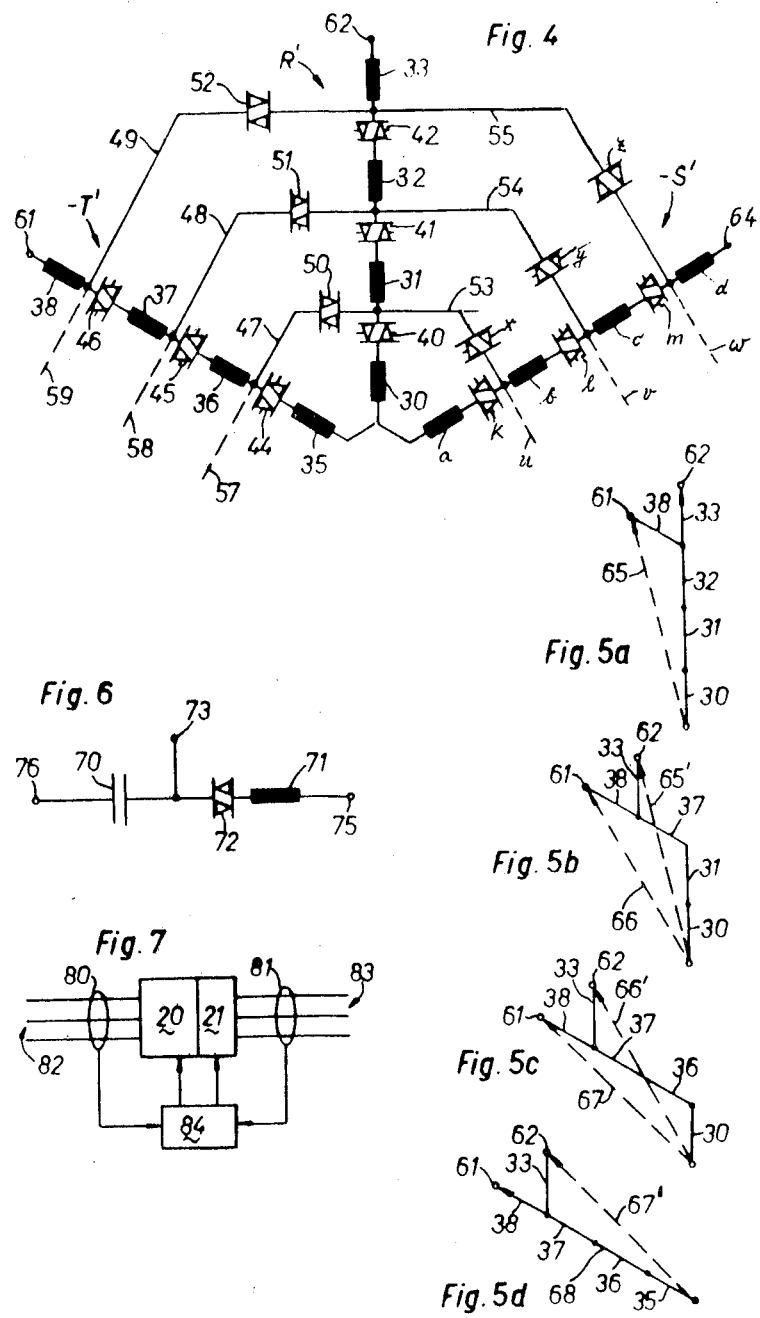

TRANSFORMER FOR THE CONTROLLABLE SHIFTING OF THE PHASE ANGLE OF OUTPUT VOLTAGES IN RELATION TO THE PHASE ANGLES OF INPUT VOLTAGES

CROSS REFERENCE TO RELATED CASE

This application is related to our commonly assigned, copending U.S. application Ser. No. 06/092,348, filed Nov. 8, 1979, now U.S. Pat. No. 4,302,716, and entitled "Controllable Phase Shifter".

BACKGROUND OF THE INVENTION

The present invention relates to a new and improved construction of transformer for the controllable shifting of the phase angle of the output voltages in relation to the input voltages, especially for an alternating-current voltage compound network, containing at least one secondary winding galvanically decoupled from the primary winding and subdivided into stages or sections.

When coupling together a number of energy transmission lines attempts are made to ensure that the phase angles of the coupled alternating-current voltages are in-phase. Consequently, there is improved the transmission characteristics of the line and there is avoided any spill back at the generators. This desire is made more difficult because the phase angle of a voltage infed to a transmission line is shifted along the line and by the load at the end of the line, if such load is not a pure active resistance.

In the case of compound networks there are preferably employed shunt transformers in order to accommodate the phase angle of the voltages in the different network sections. The shunt transformer induces in each conductor of the line a shunt voltage superimposed upon the input voltage, and the phase angle of which, in relation to the phase angle of the input voltage, is shifted by 90°, so that there appears an output voltage whose phase angle is shifted in relation to the phase angle of the input voltage. Usually, the winding provided for generating the shunt voltage is divided into a number of stages, so that there can be tapped-off shunt voltages having different amplitudes. This renders it possible to shift the shunt output voltage throughout different angular ranges. Shunt transformers only render possible a stepwise shifting of the angle of the output voltage in one direction and through relatively small regions and require for changing the tapping at the shunt voltage winding technically complicated and relatively sluggish mechanical switches.

Hence, there has already been proposed a controllable phase shifter which can be employed in lieu of a shunt transformer, for the direct connection of two transmission lines or for generating the additional voltage or potential for a shunt transformer. This phase shifter contains at least two reactive impedances connected in series, between which there is provided a tap, and connected in series with at least one of these impedances is an electrically controlled current switch, preferably a bidirectional thyristor. This phase shifter can be connected directly between two phases of the transmission line or the secondary windings of a transformer. Such phase shifter renders possible a practically continuous shifting of the phase angle of the tapped-off voltage in each of both possible directions. The current switch of the phase shifter can be connected with an electronic control circuit, rendering possible a practically undelayed optimum alignment of the phase angle of the delivered potential. With this phase shifter the shifting of the phase angle is accomplished by the reactive or blind load in the reactive impedances, accounting for the reason why the magnitude of the phase shift determines the requisite rated load of the impedances. The rated load amounts to approximately one-quarter of the power rating or power-handling capacity for a phase shift through 60°. The described phase shifter, notwithstanding its technological advantages, therefore for purely economical reasons is only useful to a limited extent for energy transmission lines.

SUMMARY OF THE INVENTION

Therefore, with the foregoing in mind it is a primary object of the present invention to provide a new and improved construction of transformer for the controllable shifting of the phase angle of output voltages in relation to the phase angle of input voltages in a manner not afflicted with the aforementioned drawbacks and limitations of the prior art proposals.

Another and more specific object of the present invention aims at providing a new and improved construction of transformer, by means of which it is possible to shift the phase angle of the secondary voltage in both directions throughout the entire angular range between two secondary windings, the phase shift not being produced by reactive or wattless power, rather through vectorial addition of two voltages and can be subdivided into random small angular ranges.

Now in order to implement these and still further objects of the invention, which will become more readily apparent as the description proceeds, the inventive transformer is manifested by the features that there are provided a plurality of switches for the selective switching together of the stages of the secondary winding, in order to selectively vectorially add the partial voltages, induced in the stages of the secondary winding, into the output voltage.

The novel transformer renders possible tapping-off at the connection line between the connection terminals of the secondary winding voltages whose phase angle are shifted through small ranges. The phase shift is accomplished by vectorial addition of the voltages at the stages of the secondary winding and does not require any active impedances, whose rated load must be dimensioned in accordance with the maximum power rating or power-handling capacity. The phase shift is preferably accomplished by turning-on and turning-off electronic switches and is practically free of time-delay in relation to the frequency of the transmitted output, which in a compound network renders possible dynamic accomodation of the phase angle to alternating supply or load conditions. Between the connection terminals of the secondary winding there also can be connected a controllable phase shifter, whose reactive impedances can be dimensioned for relatively small rated outputs owing to the small angular range and which renders possible a continuous shifting of the phase angle of the voltage. The novel transformer of the present development can be beneficially employed for the direct coupling of network sections with phase shifted voltages. But, it is however possible to use the phase shifted voltage which can be tapped-off at the connection terminals of the secondary windings as an additional voltage or potential in a shunt transformer.

The novel transformer renders possible a previously not attainable stabilization of a transmission network, in that there can be compensated possible oscillations in the network, without altering the synchronization of the network. The transformer of the invention also renders possible, by accommodation of the phase angle of the voltages in the transmission line to the phase angle of the generator voltage, to limit possible fault or short-circuit currents, and thus, to protect the generator and turbine shafts against overload.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 is a schematic circuit diagram of two secondary windings, subdivided into stages, of the transformer illustrated in FIG. 2 showing the switches for the selective switching together of individual winding stages or sections;

FIGS. 5a to 5d illustrate the angular range through which there can be switched the phase angle of the voltage or potential which can be tapped-off at two secondary windings of the arrangement of FIG. 4;

FIG. 6 is a schematic circuit diagram of a controllable phase shifter which can be connected between the external terminals of the secondary windings illustrated in FIG. 4; and FIG. 7 is a principle schematic circuit diagram of a novel transformer having an electronic control circuit for the switch means.

DETAILED DESCRIPTION OF THE PREFERRED EMBODIMENTS

Figure 1:
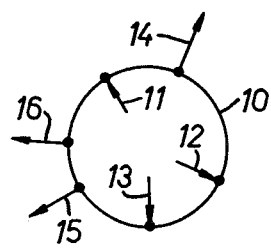
FIG. 1 is a schematic illustration of a circular line or network containing a number of power generators and loads.

With reference now to the drawings in FIG. 1 there is schematically illustrated the principle circuit diagram of a ring or main line or system 10 containing a number of infeed lines 11, 12, and 13 and load lines 14, 15 and 16. At each connection location of the infeed lines 11, 12 and 13 and the load lines 14, 15 and 16 with the ring line or system 10 there is preferably interposed in the circuit one of the novel transformers of the present development, so that the phase angle of the voltages in each infeed or supply line cooincides to the extent possible, i.e. is in-phase with the local phase angle of the voltages in the ring line 10 and the latter cooincide with the phase angles of the voltages in each of the load lines.

Figure 2:
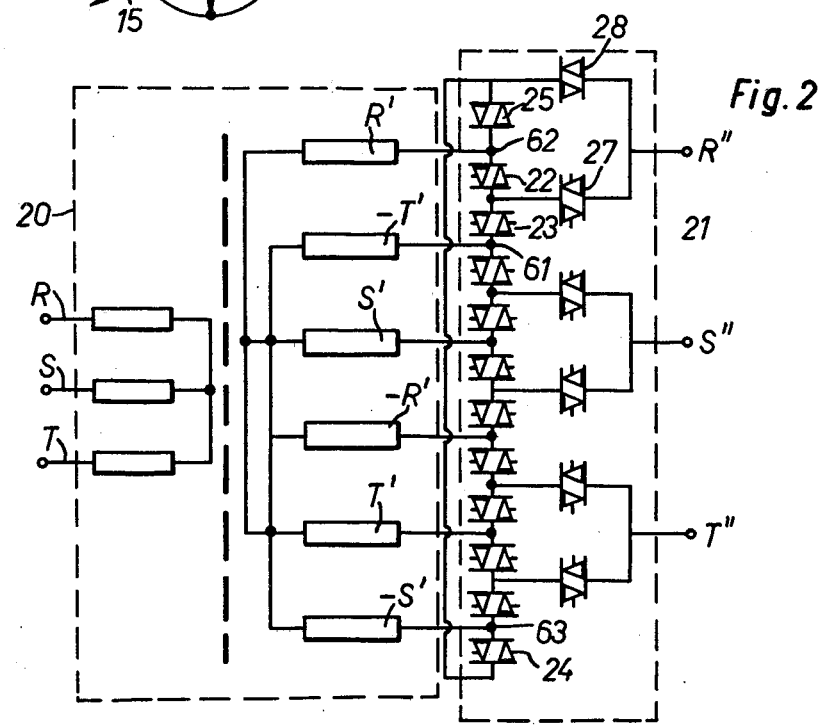
FIG. 2 schematically illustrates a preferred embodiment of novel transformer containing two three-phase secondary windings.

Now in FIG. 2 there is shown a first embodiment of transformer which is capable of effectively satisifying the aforementioned requirements. At this point it is mentioned that for the sake of simplifying the illustration in each of FIGS. 2, 4 and 6 the control lines for the depicted electronic switches and the related electronic control circuits have been conveniently omitted, particularly since the same are not important for understanding the basic concepts of the invention. As stated, in FIG. 2 there is schematically illustrated a preferred embodiment of inventive transformer. Such contains an isolation transformer 20 provided with a three-phase primary winding R, S, T and two likewise three-phase secondary windings R', S', T' and −R', −S', −T'. The inner terminals of the secondary windings R', S', T' and −R', −S', −T' are interconnected with one another, so that at the outer connection terminals there appear voltages or potentials which are mutually shifted through 60°, as best seen by referring to FIG. 3. Additionally, this transformer arrangement contains an output switching network 21 embodying groups of thyristors, each thyristor group containing two series connected bidirectional thyristors 22, 23; 24, 25 and so forth, in order to selectively connect the output voltages of those secondary windings at which there appears the voltages or potentials which have been mutually phase shifted by 60° with respect to one another, selectively with one of the output terminals R'', S'', T''. The connection points or nodes at each coacting thyristor pair, for instance the thyristor pairs 22, 23 and 24, 25, are connected by means of further bidirectional thyristors 27, 28 and so forth with an output terminal R'' of the equipment.

Figure 3:
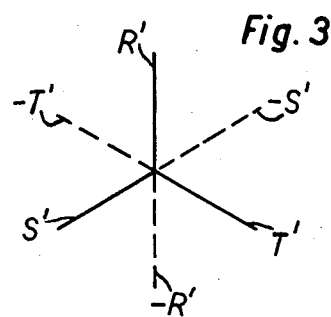
FIG. 3 is a phase diagram of the voltages or potentials appearing at the connection terminals of the secondary windings of the transformer shown in FIG. 2.

FIG. 4 illustrates three secondary windings R', −T', −S' in a representation corresponding to that of FIG. 3, wherein the voltages induced in the windings mutually enclose the same angle as the windings. Each winding is subdivided into four stages or sections 30, 31, 32, 33 and 35, 36, 37, 38 and a, b, c, d, respectively. The inner connections or terminals of each winding and the inner winding stages 30, 31 and a are galvanically coupled with one another. Between the stages of each winding there are connected bidirectional thyristors 40, 41, 42 and 44, 45, 46 and k, l, m, respectively. Additionally, the inner connections or terminals of the winding stages of the three windings are likewise interconnected with one another by means of the lines or conductors 47, 48, 49 and 53, 54, 55, at which there are arranged further bidirectional thyristors 50, 51, 52 and x, y, z, respectively.

The further secondary windings S', −R', T' are subdivided in the same manner into winding stages or sections and connected with the neighboring windings, as the same has been indicated by the broken illustrated lines 57, 58, 59 and u, v, w.

Now in the vector diagrams of 5a, 5b, 5c, and 5d there have been illustrated the phase angles which can be adjusted by interconnecting or disconnecting the winding stages shown in FIG. 4. If all of the bidirectional thyristors 40, 41, 42 of the winding R' are switched into their conductive state, represented by FIG. 5a, then there appears at the output terminal 62 of the secondary winding R' the sum of the voltages induced in the winding stages 30, 31, 32, 33, whose phase angle coincides with the phase angle of the winding R' illustrated in FIGS. 3 and 4. If additionally the connection thyristor 52 is switched into its conductive state, then there appears at the output terminal 61 of the winding −T' a voltage or potential 65 which corresponds to the vectorially added partial voltages at the stages 30, 31, 32 and 38. By virtue of the angle position of the stage 38 in the winding −T' in relation to the stages 30, 31, 32 in the winding R', the voltage 65 is shifted in the counterclockwise direction in relation to the voltage appearing at the output terminal 62 by about 15°. If for the winding R' only the thyristors 40, 41 are placed into their conductive state, and in addition thereto the connection thyristors 51, 52 and in the winding −T' the thyristor 46 is switched into its conductive state, then, as shown in FIG. 5b, there appears at the output terminal 62 a voltage 65' which has been shifted by about 15° in the counterclockwise direction in relation to the phase angle of the winding R' and at the output terminal 61 of the winding −T' there appears a voltage 66 which has been shifted through an angle of about 30°. If, as shown in FIG. 5c, by turning-on the thyristor 40 in the winding R', the connection thyristors 50, 52 and the thyristors 45, 46 in the winding −T', the winding stages or sections 30, 36, 37, 38 and 33 are connected in series, then there appears at the output terminal 62 a voltage 66' and at the output terminal 61 a voltage 67, which are phase shifted in the counterclockwise directions through about 30° and 45°, respectively in relation to the phase angle of the winding R'. If finally the thyristors 44, 45, 46 and 52 are switched into their conductive state, and thus, all of the stages of the winding −T' are connected in series, and the stage 33 of the winding R' is connected in series with the windings 35, 36, 37, then the phase angle of the voltage 68 at the output terminal 61 coincides with the direction of the winding −T' and the voltage 67' at the terminal 62 is phase shifted by about 15° in clockwise direction in relation to the voltage 68.

It should be understood that the described phase shifted voltages also can be obtained by differently switching together or interconnecting the winding stages. For instance, there also then would appear at the output terminal or connection 62 the voltage 65' if the thyristor 44 in the winding −T', the connection thyristor 50 and the thyristors 41, 42 are switched into their conductive stage, and thus, the winding stages 35, 31, 32, 33, are connected in series. These considerations will be readily apparent to any one skilled in the art, so that it is unnecessary to here describe further examples of possibly switching together the winding stages.

Equally, it is to be readily understood that by turning-off the connection thyristors 50, 51, 52 and turning-on the thyristors x, y, z in the lines 53, 54, 55 and the thyristors k, l, m between the stages of the winding −S', there appear at the output terminal of the winding R' voltages whose phase angle either corresponds to the direction of the winding R' or, however, are shifted in clockwise direction through about 15°, 30° or 45° in relation to the first-mentioned voltage.

In this manner it is possible to shift in a stepwise manner the phase angle of the voltage at the output terminal 62 of the winding R' in the clockwise direction and in the counterclockwise direction, and the number of shifting steps possible between "neighboring" windings corresponds to the number of winding stages in such windings.

The voltages at the connection terminals 62, 61 of the windings R' and −T' can be delivered by means of the thyristors 22 and 23, respectively, and the thyristor 27 to the output terminal R". The same output terminal R" can be connected with the aid of the thyristors 24, 25 and 28 also with the connection terminals 62, 63 of the windings R' and −S', respectively. This renders it possible tapping-off a voltage at the output terminal R", whose angle can be shifted in steps and, in the described embodiment, in each case through about 15° between the phase angles of the windings −S' to −T'.

It should be understood that the same considerations are valid for the voltages appearing at the connection terminals of the windings S', −T', −R' and T', −R', −S' and at the output terminals S" and T".

The connection terminals of the secondary windings can also be connected with a controllable phase shifter, which then replaces the thyristors 22, 23; 24, 25 and so forth, shown in FIG. 2. In FIG. 6 there has been illustrated the principle circuit arrangement of a suitable phase shifter. This phase shifter contains two reactive impedances connected in series, of which the one impedance, in the embodiment under discussion, is a capacitor 70, the other impedance is an inductance 71. At least one of the impedances has operatively associated therewith a controllable bidirectional thyristor 72. Between the impedances and the related thyristors there is arranged the tap 73 of the phase shifter. In the embodiment under discussion the connection terminals 75, 76 are provided for connection with the output terminals of "neighboring" secondary windings.

As has already been previously described, with such phase shifter the rated power of the reactive impedances is dependent upon the phase angle of the strived for phase shift. Because the novel transformer of the present development enables dividing the angle between the phases into random small regions, it is possible to construct a phase shifter through the use of conventional components and by means of which phase shifter it is possible to continuously shift the voltage within one such partial region or range.

It should be understood that the described transformer can be accommodated to particular operating conditions and can be appropriately altered. For instance, it is not necessary to use a transformer having two three-phase secondary windings. Furthermore, it is possible to subdivide the secondary windings in less than or more than the illustrated four stages, and thus, to increase or reduce the range of the stepwise shifting of the phase angle of the voltage. When using a transformer working with only one three-phase secondary winding the inner ends of the stages of each winding branch must be necessarily connected with the corresponding ends of the stages of both of the other winding branches, and thus, all of the connection lines must be provided with a switch. The same holds true for the described transformer containing two three-phase secondary windings, if there is to be shifted the phase angle at both sectors which enclose the phase correlated to each winding branch. In the case of a transformer having two three-phase secondary windings where the phase angle of the output voltage only should be shifted between the angle value of the voltages at the winding branches of the one winding and the winding branches of the other winding which neighbor in the clockwise sense or in the counterclockwise sense (for instance between the winding branches R', S', T' and −T', −R', −S'), it is not necessary that the connection lines between the inner ends of the stages of such winding branches contain a switch. The same is analogously also true for such transformers having more than two and, for instance four three-phase secondary windings. If the phase shift only is needed in one direction, then the output voltage also can be directly tapped-off at the connection terminals of the one secondary winding and there can be dispensed with the output switching network 21. Additionally, it is possible to connect the illustrated star circuit of the windings of the transformer into a delta winding configuration. As already described above, there is preferably used an electronic control circuit which controls the thyristors in the transformer and at the output switching network as a function of the phase position of the input voltage of the primary winding and the output voltage of the secondary winding, which, in turn, enables always optimumly mutually accommodating the phase shift of the output voltage in relation to the input voltage, brought about by the transformer, even in the event of possible rapid changes.

While there are shown and described present preferred embodiments of the invention, it is to be distinctly understood that the invention is not limited thereto, but may be otherwise variously embodied and practiced within the scope of the following claims.

ACCORDINGLY,

What we claim is:

1. A transformer for the controllable shifting of the phase angle of the output voltages in relation to the phase angles of the input voltages, especially for an alternating-current compound network, including at least one three-phase secondary winding galvanically decoupled from the primary winding, and in which the inner ends of the secondary winding sections corresponding to the phases are coupled with one another, each secondary winding section being divided into stages, and having a switch connected between the neighboring stages of each secondary winding section, comprising:

two three-phase secondary windings, the voltages of which are shifted through 60° in the mutually corresponding winding sections and whose phase angles neighbor one another in the phase diagram;

respective connection lines provided between the inner end of each stage of each winding section and the inner ends of the corresponding stages of at least one of the winding sections neighboring one another in the phase diagram; and respective switches provided for predetermined ones of said connection lines which connect the inner ends of the stages of one winding with the corresponding ends of the stages of both of the neighboring windings in the phase diagram.

2. The transformer as defined in claim 1, further including an output voltage network which contains two switches for the selective tapping-off of the voltage from one of the connection terminals of the secondary winding sections neighboring one another in the phase diagram and wherein one terminal of the two switches is connected with one of said connection terminals and the other terminal with said other one.

3. The transformer as defined in claim 2, wherein the output switching network for the continuous shifting of the phase angle of the voltages appearing at the connection terminals of the secondary winding portions neighboring one another in the phase diagram includes a respective controllable phase shifter between such connection terminals.

4. The transformer as defined in claim 3, wherein said controllable phase shifter has at least two reactive impedances connected in series, between which a tap is connected and an electronically controlled current switch is connected in series with both reactive impedances.

* * * * *